(12) United States Patent
Zhang et al.

(10) Patent No.: US 12,444,731 B2
(45) Date of Patent: *Oct. 14, 2025

(54) HIGH LOADING ELECTRODES

(71) Applicant: Navitas Systems, LLC, Ann Arbor, MI (US)

(72) Inventors: Pu Zhang, Ann Arbor, MI (US); Peter Aurora, Ann Arbor, MI (US); Michael Wixom, Ann Arbor, MI (US)

(73) Assignee: Navitas Systems, LLC, Ann Arbor, MI (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/385,972

(22) Filed: Nov. 1, 2023

(65) Prior Publication Data

US 2024/0063369 A1 Feb. 22, 2024

Related U.S. Application Data

(63) Continuation of application No. 17/862,581, filed on Jul. 12, 2022, now Pat. No. 11,843,111, which is a (Continued)

(51) Int. Cl.
*H01M 4/525* (2010.01)
*H01M 4/04* (2006.01)
(Continued)

(52) U.S. Cl.
CPC ......... *H01M 4/362* (2013.01); *H01M 4/0404* (2013.01); *H01M 4/0471* (2013.01);
(Continued)

(58) Field of Classification Search
CPC .. H01M 4/362; H01M 4/0404; H01M 4/0471; H01M 4/13
See application file for complete search history.

(56) References Cited

U.S. PATENT DOCUMENTS

| 5,464,705 A | 11/1995 | Wainwright |
| 6,589,694 B1 | 7/2003 | Gosho et al. |

(Continued)

FOREIGN PATENT DOCUMENTS

| EP | 1671385 B1 | 6/2006 |
| EP | 2320499 A1 | 5/2011 |

(Continued)

OTHER PUBLICATIONS

Chang, C. et al., The Influence of Different Electrode Fabrication Methods and Poly(Vinylidene Fluoride) Binders on The Anode Electrode Dimension Stability and Cyclability in Lithium-Ion Batteries, Journal of New Materials for Electrochemical Systems, Jan. 1, 2008, pp. 43-47, vol. 11, No. 1, Montreal, Canada.

*Primary Examiner* — Olatunji A Godo
(74) *Attorney, Agent, or Firm* — Weston R. Gould; Dinsmore & Shohl LLP

(57) ABSTRACT

Provided are electrodes that may be used in electrochemical cells that incorporate relatively high loading of active material while also demonstrating excellent adhesion, resistance to mechanical breakdown, and also offer improved capacity retention, particularly at discharge rates of C/2 or greater.

20 Claims, 12 Drawing Sheets

Related U.S. Application Data continuation of application No. 17/142,339, filed on Jan. 6, 2021, now Pat. No. 11,430,978, which is a continuation of application No. 16/307,715, filed as application No. PCT/US2017/036312 on Jun. 7, 2017, now Pat. No. 10,916,765.

(60) Provisional application No. 62/346,799, filed on Jun. 7, 2016.

(51) Int. Cl.
| | | |
|---|---|---|
| *H01M 4/13* | (2010.01) | |
| *H01M 4/139* | (2010.01) | |
| *H01M 4/36* | (2006.01) | |
| *H01M 4/62* | (2006.01) | |
| *H01M 4/02* | (2006.01) | |
| *H01M 10/052* | (2010.01) | |

(52) U.S. Cl.
CPC ............ *H01M 4/13* (2013.01); *H01M 4/139* (2013.01); *H01M 4/525* (2013.01); *H01M 4/622* (2013.01); *H01M 2004/021* (2013.01); *H01M 2004/027* (2013.01); *H01M 2004/028* (2013.01); *H01M 10/052* (2013.01)

(56) References Cited

U.S. PATENT DOCUMENTS

| | | | |
|---|---|---|---|
| 10,916,765 B2 | 2/2021 | Zhang et al. | |
| 11,430,978 B2* | 8/2022 | Zhang | ............ H01M 4/525 |
| 11,843,111 B2* | 12/2023 | Zhang | ............ H01M 4/622 |
| 2012/0177990 A1 | 7/2012 | Mitsuhashi et al. | |
| 2012/0208087 A1 | 8/2012 | Yamamoto et al. | |
| 2012/0308861 A1 | 12/2012 | Xing et al. | |
| 2014/0072850 A1 | 3/2014 | Kwon et al. | |
| 2015/0179998 A1 | 6/2015 | Kagami et al. | |
| 2017/0263927 A1* | 9/2017 | Kim | ............ H01M 4/366 |

FOREIGN PATENT DOCUMENTS

| | | |
|---|---|---|
| JP | 2012-022858 A | 2/2012 |
| JP | 2013-149407 A | 8/2013 |
| JP | 2014-107182 A | 6/2014 |
| WO | 2012/064531 A1 | 5/2012 |
| WO | 2013-138588 A1 | 9/2013 |

\* cited by examiner

A

B

A

B

A

B

HIGH LOADING ELECTRODES

CROSS REFERENCE TO RELATED APPLICATIONS

This application is a continuation of U.S. patent application Ser. No. 17/862,581 filed Jul. 12, 2022, which is a continuation of U.S. patent application Ser. No. 17/142,339 filed Jan. 6, 2021 (now U.S. Pat. No. 11,430,978), which is a continuation of U.S. patent application Ser. No. 16/307,715 filed Dec. 6, 2018 (now U.S. Pat. No. 10,916,765), which is a U.S. National Stage under 35 U.S.C. § 371 of PCT/US2017/036312 filed Jun. 7, 2017 and which depends from and claims priority to U.S. Provisional Application No. 62/346,799 filed Jun. 7, 2016, the entire contents of each of which are incorporated herein by reference.

FIELD

This disclosure relates to high loading electrodes for use in electrochemical devices such as secondary batteries.

BACKGROUND

The search for improved energy density is driven in part by ever increasing demand for electric vehicles with both increased range and lighter weight. To achieve this goal the power source for such vehicles must be capable of operating at a relatively high temperature, having high energy density and exhibiting excellent cycle life characteristics. To address these needs, it may be helpful to increase amount of active material included into a battery of the same size.

Prior attempts to increase the areal loading or energy density of active materials, however, has met with limited success primarily due to resulting issues of reduced adhesion and flexibility of the electrode thereby leading to cracking of the electrode decreasing cycle life. As such there is a need for electrodes with increased areal loading without suffering from the reduced mechanical characteristics or reduced performance of prior materials.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are electrodes that allow for greater incorporation of active material, i.e., high loading, while also demonstrating excellent adhesion and resistance to mechanical breakdown and improved capacity retention, particularly at discharge rates of C/2 or greater. Optionally, high loading electrodes as provided herein are characterized by areal loading. An electrode is a cathode or an anode. In some aspects, the loading of active material in an anode may be areal density of 10 mg/cm$^2$ or greater. A characteristic of the electrodes as provided herein in some aspects is an increased uniformity in binder distribution such that the increased binder migration toward the electrode surface of prior electrode systems is reduced resulting in greater binder distribution uniformity and/or increased binder concentration at the active/current collector interface. For an anode, the ratio of binder concentration at a surface of the anode active material relative to the binder at a current collector substrate surface is 3.0 or lower, optionally 2.0 or lower. The ability to produce electrodes with high active material loadings at this increased binder uniformity is believed to result in the improved adhesion and mechanical characteristics of the resulting electrodes while also supporting improved capacity retention.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings, where like structure is indicated with like reference numerals and in which:

DETAILED DESCRIPTION

Figure 1:
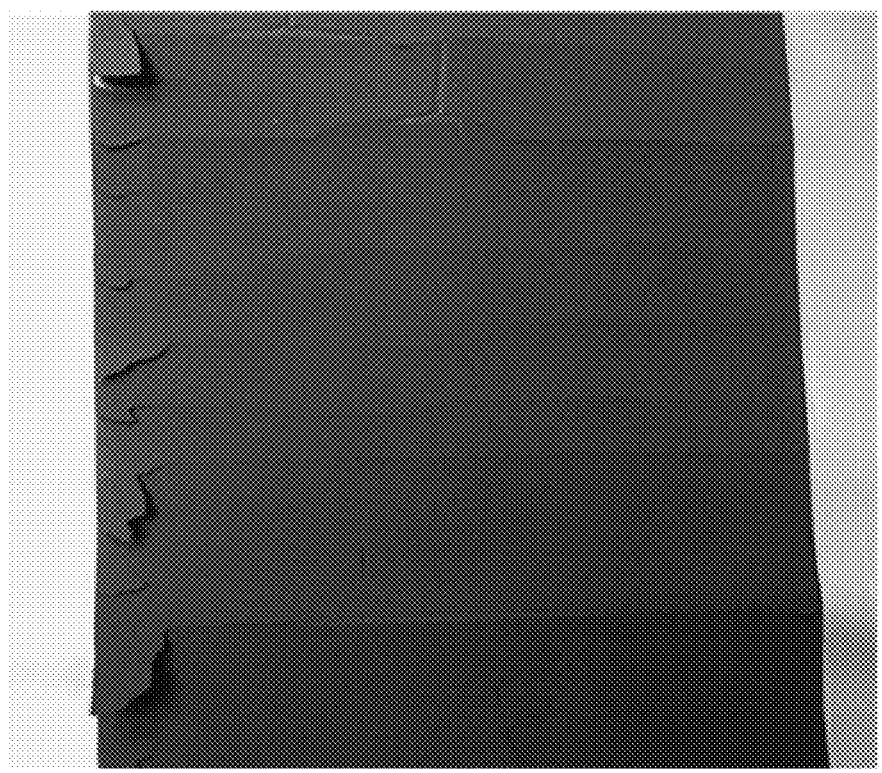
FIG. 1 is a representative image of an cathode dried using air (A) or using VFM (B) and subsequently subjected to a mandrel test.
Figure 1:
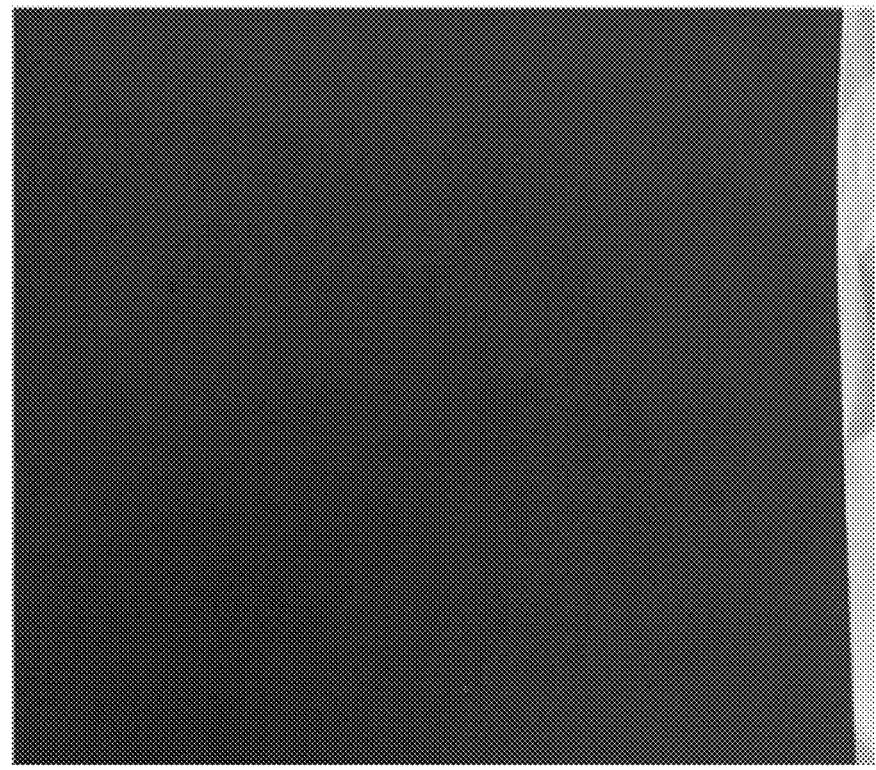

The following description of particular aspect(s) is merely exemplary in nature and is in no way intended to limit the scope of the invention, its application, or uses, which may, of course, vary. The disclosure is presented with relation to the non-limiting definitions and terminology included herein. These definitions and terminology are not designed to function as a limitation on the scope or practice of the disclosure but are presented for illustrative and descriptive purposes only. While the processes or compositions are described as an order of individual steps or using specific materials, it is appreciated that steps or materials may be interchangeable such that the description may include multiple parts or steps arranged in many ways as is readily appreciated by one of skill in the art.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Provided are high loading electrodes that display improved energy density. The electrodes show unexpectedly high adhesive properties and capacity retention at rates at or equal to C/2. High loading as used herein refers to the amount of electrode active material measured either as areal density of the electrode active material or electrochemical loading. Optionally, a high loading electrode is one that has an areal loading of cathode active material of 30 mg/cm$^2$ or greater, optionally 30 milligrams per square centimeter (mg/cm$^2$) to 75 mg/cm$^2$, optionally 30 mg/cm$^2$ to 50 mg/cm$^2$, or an anode active material areal loading of 10 mg/cm$^2$ or greater, optionally 10 mg/cm$^2$ to 30 mg/cm$^2$, optionally 15 mg/cm$^2$ to 25 mg/cm$^2$.

Optionally, high loading is defined by the electrochemical loading of active material. In such circumstances, a high loading electrode has an electrochemical loading of 4 milliamperehours per square centimeter (mAh/cm$^2$) or greater, optionally 4-15 mAh/cm$^2$, optionally 4-10 mAh/cm$^2$, optionally at or greater than 4 mAh/cm$^2$, optionally at or greater than 5 mAh/cm$^2$, optionally at or greater than 6 mAh/cm$^2$, optionally at or greater than 7 mAh/cm$^2$, optionally at or greater than 8 mAh/cm$^2$, optionally at or greater than 9 mAh/cm$^2$, optionally at or greater than 10 mAh/cm$^2$.

The electrodes as provided herein include an electrochemically active material and a binder that are coated onto a current collector substrate either directly on or via an intermediate substrate or material. An electrochemically active material is optionally suitable for use in a cathode, such as a cathode active material. Optionally, an electrochemically active material is optionally suitable for use in an anode, such as an anode active material. An "active material" is a material that participates in electrochemical charge/discharge reaction of the battery such as by absorbing or desorbing an ion such as hydrogen, lithium, sulfur or other ion. Optionally, an anode active material, cathode active, material or both are suitable for use in a lithium ion cell. Optionally, an anode active material, cathode active, material or both are suitable for use in a lithium sulfur cell. Optionally, an anode active material is defined as an electrochemically active material that will delithiate at potentials below 1.5 V versus lithium metal, optionally below 2.0 V versus lithium metal. Optionally, a cathode active material is defined as an electrochemically active material that will lithiate at potentials above 1.5 V versus lithium metal, optionally above 2.0 V versus lithium metal. An anode active material or a cathode active material is optionally suitable for use in other cell types, optionally metal hydride cells, lead acid cells, or nickel-cadmium cells. Optionally, an anode active material or cathode active material is not suitable for use in one or more of metal hydride cells, lead acid cells, or nickel-cadmium cells.

The electrochemically active material is included in an electrode at a high loading. In some aspects, an electrochemically active material is a cathode active material at an areal density of 30 mg/cm$^2$ or greater, optionally 30 mg/cm$^2$ to 75 mg/cm$^2$, optionally 30 mg/cm$^2$ to 50 mg/cm$^2$, optionally at or greater than 30 mg/cm$^2$, optionally at or greater than 35 mg/cm$^2$, optionally at or greater than 40 mg/cm$^2$, optionally at or greater than 45 mg/cm$^2$, optionally at or greater than 50 mg/cm$^2$, optionally at or greater than 55 mg/cm$^2$, optionally at or greater than 60 mg/cm$^2$, optionally at or greater than 65 mg/cm$^2$, optionally at or greater than 70 mg/cm$^2$. A cathode active material, is some aspects, is included in an electrode at an electrochemical loading of 4 mAh/cm$^2$ or greater, optionally at or greater than 5 mAh/cm$^2$, optionally at or greater than 6 mAh/cm$^2$, optionally at or greater than 7 mAh/cm$^2$, optionally at or greater than 8 mAh/cm$^2$, optionally at or greater than 9 mAh/cm$^2$, optionally at or greater than 10 mAh/cm$^2$.

In some aspects, an electrochemically active material is an anode active material at an areal density of 10 mg/cm$^2$ or greater, optionally 10 mg/cm$^2$ to 30 mg/cm$^2$, optionally 15 mg/cm$^2$ to 25 mg/cm$^2$, optionally at or greater than 11 mg/cm$^2$, optionally at or greater than 12 mg/cm$^2$, optionally at or greater than 13 mg/cm$^2$, optionally at or greater than 14 mg/cm$^2$, optionally at or greater than 15 mg/cm$^2$, optionally at or greater than 16 mg/cm$^2$, optionally at or greater than 17 mg/cm$^2$, optionally at or greater than 18 mg/cm$^2$, optionally at or greater than 19 mg/cm$^2$, optionally at or greater than 20 mg/cm$^2$, optionally at or greater than 21 mg/cm$^2$, optionally at or greater than 22 mg/cm$^2$, optionally at or greater than 23 mg/cm$^2$, optionally at or greater than 24 mg/cm$^2$, optionally at or greater than 25 mg/cm$^2$. An anode active material, is some aspects, is included in an electrode at an electrochemical loading of 4 mAh/cm$^2$ or greater optionally at or greater than 5 mAh/cm$^2$, optionally at or greater than 6 mAh/cm$^2$, optionally at or greater than 7 mAh/cm$^2$, optionally at or greater than 8 mAh/cm$^2$, optionally at or greater than 9 mAh/cm$^2$, optionally at or greater than 10 mAh/cm$^2$.

The provided electrodes have a high loading of active material but also show improved adhesion or capacity retention at discharge rates of C/2 or greater than electrodes produced by prior techniques. Among the characteristics of the provided electrodes that result in the improved properties is optionally the binder distribution throughout the electrode. Whereas prior high loading electrodes create a binder distribution whereby the binder is somewhat segregated to higher concentration at the surface of the electrode (distal from the substrate), typically 2 to 3 or more times the concentration binder present at the current collector surface, the provided electrodes have a more uniform binder distribution whereby the ratio of binder present at the electrode surface relative to the substrate surface is less than 2 for a cathode or optionally less than 3 for an anode. This more uniform binder distribution produces an electrode that is more physically robust and less susceptible to cracking either during cell formation, handling, or cycling. At the same time, the resulting electrodes have better capacity retention.

Binder distribution is optionally defined as the amount (e.g., concentration) of binder after drying between differing regions defined in a direction perpendicular to the substrate surface. In some aspects, the electrode thickness is separated into 5 zones with zone one (1) being the $\frac{1}{5}^{th}$ of the electrode thickness nearest that current collector substrate (proximal), and zone five (5) being the $\frac{1}{5}^{th}$ of the electrode thickness nearest the electrode surface (distal the current collector substrate) with zones 2, 3, and 4 distributed therebetween.

In some aspects whereby an electrochemically active material is a cathode active material the concentration ratio of binder in zone 5 to zone 1.0 is 2.0 or lower, optionally 1.8 or lower, optionally 1.6 or lower, optionally 1.0 to 2.0, optionally 1.0 to 1.8, optionally 1.0 to 1.6, optionally 1.0 to 1.5, optionally 1.0 to 1.4, optionally 1.2 to 2, optionally 1.2 to 1.8, optionally 1.2 to 1.6, optionally 1.2 to 1.5, optionally 1.2 to 1.4.

In some aspects whereby an electrochemically active material is an anode active material the concentration ratio of binder in zone 5 to zone 1 is 3.0 or lower, optionally 2.5 or lower, optionally 2.3 or lower, optionally 2.0 to 3.0, optionally 2.0 to 2.8, optionally 2.0 to 2.5, optionally 2.0 or lower, optionally 1.8 or lower, optionally 1.6 or lower, optionally 1.0 to 2.0, optionally 1.0 to 1.8, optionally 1.0 to 1.6, optionally 1.0 to 1.5, optionally 1.0 to 1.4, optionally 1.2 to 2, optionally 1.2 to 1.8, optionally 1.2 to 1.6, optionally 1.2 to 1.5, optionally 1.2 to 1.4.

In both an anode or cathode active material, the ratio of binder content at a midpoint (zone 3) relative to zone 1 is 1.5 or lower, optionally 1.4 or lower, optionally 1 to 1.5, optionally 1 to 1.4, optionally 1 to 1.3, optionally 1.15 to 1.5, optionally 1.15 to 1.4, optionally 1.15 to 1.3.

The resulting electrodes with high loading optionally have a cycle life characterized by in excess of 80% residual capacity at cycle 20, optionally in excess of 80% residual capacity at cycle 25, optionally in excess of 80% residual capacity at cycle 50, optionally in excess of 80% residual capacity at cycle 100, optionally in excess of 80% residual capacity at cycle 150, optionally in excess of 80% residual capacity at cycle 200, optionally in excess of 80% residual capacity at cycle 250, optionally in excess of 80% residual capacity at cycle 300, optionally in excess of 80% residual capacity at cycle 350, optionally in excess of 80% residual capacity at cycle 400, optionally in excess of 80% residual capacity at cycle 450, optionally in excess of 80% residual capacity at cycle 500.

In some aspects, the capacity retention of an electrode is 90% or greater when discharged at 0.5C rate, optionally 91%, 92%, 93%, 94%, 95%, 96%, or 97% or greater when discharged at a 0.5C rate. Optionally, capacity retention of an electrode is 80% or greater when discharged at 0.6C rate, optionally 81%, 82%, 83%, 84%, 85%, 86%, 87%, 88%, or 89%, or greater when discharged at 0.6C rate. Optionally, capacity retention of an electrode is 50% or greater when discharged at 1C rate, optionally 55%, 60%, 65%, 70%, 75%, 80%, or 85%, or greater when discharged at 1C rate.

An electrode includes an electrochemically active material. An electrochemically active material is optionally including or is formed from silicon, Ni, Co, Mn, Mg, Fe, Ti, Al, a rare earth metal, carbon (e.g. graphite etc.), a conductive additive such as a carbon additive, or combinations thereof. Optionally, an active material includes or is a lithium nickel-cobalt-manganese oxide active material such as NCM-111, NCM-424, NCM-523, NCM-622, NCM-811 or lithium nickel cobalt aluminum (NCA). The amount of electrode active material is optionally present at a weight percent of 50% or greater relative to the binder.

An electrochemically active material is optionally suitable for use in formation of an anode or a cathode. In some aspects, an electrochemically active material optionally is or includes silicon, graphitic carbon, silicon carbon composites, tin, Ge, Sb, Al, Bi, As, Li metal, lithium alloys, metal alloys, transition metal oxides, nitride materials, sulfide materials, and combinations thereof. An alloy optionally includes one or more of Mg, Fe, Co, Ni, Ti, Mo, and W.

Illustrative examples of a metal alloy for use as an electrochemically active material include silicon alloys. A silicon alloy is optionally and alloy of silicon and Ge, Be, Ag, Al, Au, Cd, Ga, In, Sb, Sn, Zn, or combinations thereof. The ratio of the alloying metal(s) to silicon is optionally 5% to 2000% by weight, optionally 5% to 500% by weight, optionally 20% to 60% by weight, based on silicon.

In some aspects, an electrochemically active material includes a lithium alloy. A lithium alloy optionally includes any metal or alloy that alloys with lithium, illustratively including Al, Si, Sn, Ag, Bi, Mg, Zn, In, Ge, Pb, Pd, Pt, Sb, Ti, tin alloys, and silicon alloys.

Additional examples of alloys and methods of alloy production can be found in U.S. Pat. No. 6,235,427.

In some aspects, the electrochemically active material is an anode active material. Illustrative examples of anode active materials include: silicon; tin; carbon and graphitic carbon materials such as natural graphite, graphene, artificial graphite, expanded graphite, carbon fibers, hard carbon, carbon black, carbon nanotubes, fullerenes or activated carbon; a composite material of a metal or metal compound and a carbon or graphite material whereby a metal optionally includes lithium and silicon; or a lithium-containing nitride. Optionally, an electrochemically active material is not graphite alone in the absence of silicon, lithium, or a metal. In particular aspects, an electrochemically active material is a composite material of silicon and graphitic carbon that may or may not include a carbon coating and or thermal treatment to stabilize the adhesion of the coating to the surface. In some aspects, an electrochemically active material includes a coating, illustratively a carbon coating. A carbon coating, when present, is a component of an over coating on or directly on the electrochemically active material.

In some aspects, an electrochemically active material is a cathode active material. Examples of a cathode active material include layered compounds such as lithium cobalt oxide (LiCoO$_2$) and lithium nickel oxide (LiNiO$_2$), or compounds substituted with one or more transition metals; lithium manganese oxides such as compounds of Formula Li$_{1+x}$Mn$_{2-x}$O$_4$ (0≤x≤0.33), LiMnO$_3$, LiMn$_2$O$_3$ and LiMnO$_2$; lithium copper oxide (Li$_2$CuO$_2$); vanadium oxides such as LiV$_3$O$_8$, V$_2$O$_5$ and Cu$_2$V$_2$O$_7$; Ni-site type lithiated nickel oxides of Formula LiNi$_{1-x}$M$_x$O$_2$ (M=Co, Mn, Al, Cu, Fe, Mg, B or Ga, and 0.01≤x≤0.3); lithium manganese composite oxides of Formula LiMn$_{2-x}$M$_x$O$_2$ (M=Co, Ni, Fe, Cr, Zn or Ta, and 0.01≤x≤0.1), or Formula Li$_2$Mn$_3$MO$_8$ (M=Fe, Co, Ni, Cu or Zn); LiMn$_2$O$_4$ wherein a portion of Li is substituted with alkaline earth metal ions; disulfide compounds; and Fe$_2$(MoO$_4$)$_3$; LiFe$_3$O$_4$; NCM based materials (e.g. NCM111, NCM424, NCM523, NCM622, NCM811); NCA (e.g. LiNi$_{0.8}$Co$_{0.15}$Al$_{0.05}$O$_2$); etc.

An electrochemically active material is optionally mixed with a binder. A binder is optionally a binder such as those used in secondary batteries. Illustrative examples of binder materials include but are not limited polyvinylidene difluoride (PVdF) optionally used in an n-methyl pyrrolidone (NMP) solution, and styrene butadiene rubber (SBR) binder optionally used in aqueous latex suspensions. Other illustrative binder materials include SBR/carboxymethyl cellulose (CMC) blends, CMC, polyacrylic acid (PAA), and polyvinyl alcohol (PVA). Some aspects include systems in which the binder includes a partially or fully crosslinked polyvinyl alcohol or derivative thereof. Other suitable binders known in the art may be used in some aspects. Illustrative examples of a polymer material used in some aspects of a binder include polyvinyl alcohol (PVA), polyacrylic acid (PAA), and polymethyl methacrylate (PMMA), or combinations thereof. Illustratively a polymer or copolymer that forms a component of a binder has a molecular weight of 10,000 Daltons or higher. Such polymers and copolymers (collectively "polymers"), optionally those containing PVA, PAA, or PMMA, are commercially available. The polymers or copolymers optionally have a high polymerization degree, optionally of more than 3000.

Optionally, the amount of binder is limited in an electrode, optionally to a weight percentage of 10 weight percent or less. Optionally, when an electrode is a cathode, the weight percent of binder is 2% to 10%, optionally 3% to 5%, optionally 2%-10%, optionally 3%-10%, optionally 4%40%, optionally 5%40%, optionally 6%40%, optionally 7%40%, optionally 8%-10%, optionally 9%-10%, optionally 3%, optionally 4%, optionally 5%, optionally 6%, optionally 7%, optionally 8%, optionally 9%. Optionally, the amount of binder in a cathode does not exceed 10 weight %, optionally 9 weight %, optionally 8 weight %, optionally 7 weight %, optionally 6 weight %, or optionally 5 weight %. Optionally, when an electrode is an anode that is made with an aqueous binder solvent, the weight percent of binder is 1% to 5%, optionally 2% to 4%, optionally 1%, optionally 2%, optionally 3%, optionally 4%, optionally 5%. Optionally when an electrode is an anode that is made with an aqueous binder solvent, the weight percent of binder does not exceed 5 weight %, optionally 4 weight %, optionally 3 weight %. Optionally, when an electrode is an anode that is made with an non-aqueous binder solvent (e.g., NMP or other), the weight percent of binder is 2%-10%, optionally 3%-5%, optionally 3%-10%, optionally 4%40%, optionally 5%40%, optionally 6%40%, optionally 7%40%, optionally 8%-10%, optionally 9%-10%, optionally 3%, optionally 4%, optionally 5%, optionally 6%, optionally 7%, optionally 8%, optionally 9%. Optionally, the amount of binder in an anode that is made with an non-aqueous binder solvent does not exceed 10 weight %, optionally 9 weight %, optionally 8 weight %, optionally 7 weight %, optionally 6 weight %, or optionally 5 weight %.

The electrochemically active material prior to or following combination with a binder may be in any physical form such as a particulate (e.g. powder), nanowire, sheet, nanotube, nanofiber, porous structure, whisker, nanoplatelet, or other configuration known in the art.

In an electrode, an electrochemically active material is on or directly associated with a current collector substrate. A substrate is optionally formed of any suitable electronically conductive and optionally impermeable or substantially impermeable material, including, but not limited to copper, stainless steel, titanium, or carbon papers/films, a non-perforated metal foil, aluminum foil, cladding material including nickel and aluminum, cladding material including copper and aluminum, nickel plated steel, nickel plated copper, nickel plated aluminum, gold, silver, any other suitable electronically conductive and impermeable material or any suitable combination thereof. In some aspects, substrates may be formed of one or more suitable metals or combination of metals (e.g., alloys, solid solutions, plated metals).

An electrochemically active material is optionally in contact with a binder material, optionally intermixed with a binder material, in the formation of an electrode. The electrochemically active material is optionally employed with a binder material when forming an electrode by processes readily understood in the art.

The resulting electrodes have a porosity which may be measured using known mass and calculated volume and related to actual final electrode volume as a measure of free space within the electrode. When an electrode is a cathode, a porosity is optionally 30% to 50% or any value or range therebetween, optionally 35% to 40%. When an electrode is an anode, the porosity is optionally 20% to 40% or any value or range therebetween, optionally 30% to 35%.

The electrochemically active material may be used in an electrode for a primary or a secondary battery. An electrode is optionally fabricated by suspending an electrochemically active material with a binder in a solvent to prepare a slurry, and applying the resulting slurry to a current collector substrate, followed by drying and optionally pressing. A solvent is optionally suitable to dissolve or suspend a binder. A solvent for the slurry is optionally aqueous (predominantly water) or non-aqueous (optionally excluding water). As such, water is an exemplary solvent. Additional examples of the solvent used in preparation of the electrode may include, but are not limited to carbonate-based, ester-based, ether-based, ketone-based, alcohol-based, or aprotic solvents. Specific organic solvents such as dimethyl sulfoxide (DMSO), N-methyl pyrrolidone (NMP) and ethylene glycol, and distilled water may be used. Water or other aqueous solvents (e.g. buffered aqueous systems) may be used.

The electrode active material may be contacted with the current collector substrate via a continuous spray-coating or transfer coating process and then subjected to drying.

Processes of forming a high loading electrode include a drying step. Drying is optionally performed substantially as described in U.S. patent application Ser. No. 14/385,761 in which a variable frequency microwave (VFM) drying/desiccation procedure is used to form an electrode. Briefly, a coated electrode that has not been subject to drying (or optionally was predried or partially predried) is subjected to VFM in a desired atmosphere at a desired temperature for a time necessary to sufficiently dry the electrode for subsequent use in an electrochemical cell. VFM is optionally swept in a range of 1 to 8 GHz, optionally 5 to 7 GHz, optionally 5.85 GHz to 6.65 GHz. The VFM may be varied at any suitable rate, optionally such that the rate of electrode transfer through the VFM stage is subjected to one range of VFM during the drying step. VFM drying optionally takes place over 10 min or less.

Drying an electrode is optionally done in a gaseous atmosphere, optionally an inert gas atmosphere. An atmosphere optionally is or includes nitrogen, argon, or other inert gas. Optionally, a gas atmosphere is or includes air.

Drying an electrode is performed at an atmospheric temperature. An atmospheric temperature is the temperature of the atmosphere used to dry an electrode during a VFM drying process and is optionally 1 degree Celsius (° C.) to 200° C. or any value or range therebetween. Optionally atmospheric temperature is 1° C. to 150° C., optionally 20°

C. to 150° C., optionally 25° C. to 150° C., optionally 50° C. to 150° C., optionally 120° C., optionally 80° C.

An electrochemical cell is also provided that uses an electrode formed of an electrochemically active material at a high loading substantially as provided by the invention with aspects as described herein.

An electrochemical cell optionally further includes an opposing electrode, optionally a cathode or an anode. The opposing electrode is optionally formed by processes similar to those used to form the counter electrode.

An electrochemical cell optionally includes a separator, optionally positioned between an anode and a cathode. A separator is optionally any material suitable for ion transfer. Optional separator materials include a polyolefin material (e.g. polyethylene (PE) and polypropylene (PP)), polyethylene terephthalate (PET), poly vinylidene fluoride (PVdF), among others.

An electrochemical cell includes an electrolyte. An electrolyte is optionally a solid or fluid electrolyte. Illustratively, the electrolyte includes a lithium salt and a non-aqueous organic solvent. A lithium salt is optionally $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiCl$, $LiI$, or $LiB(C_2O_4)_2$ (lithium bis(oxalato) borate; LiBOB). The lithium salt is optionally present in a concentration ranging from about 0.1 M to about 2.0 M. When the lithium salt is included at the above concentration range, an electrolyte may have excellent performance and lithium ion mobility due to optimal electrolyte conductivity and viscosity. Other suitable electrolytes for other battery types may be used in the relative battery type (e.g., alkaline electrolyte such as KOH, solid electrolytes, among others).

Various aspects of the present invention are illustrated by the following non-limiting examples. The examples are for illustrative purposes and are not a limitation on any practice of the present invention. It will be understood that variations and modifications can be made without departing from the spirit and scope of the invention. Reagents illustrated herein are commercially available, and a person of ordinary skill in the art readily understands where such reagents may be obtained.

EXPERIMENTAL

Components, Steps and Operation of Exemplary Aspects

Bench scale slurry casting was used to produce electrodes. The slurry mixing conditions were adjusted to obtain a coatable formulation for high energy cell electrode loading.

Cathodes are formed from 93 wt % lithium nickel cobalt manganese (NCM cathodes (532 or 622) as commercially available), 3 wt % conductive carbon, and 4 wt % polyvinylidene fluoride (PVdF) dispersed in N-methyl pyrrolidone (NMP). The components are mixed using a double planetary Ross mixer (Charles Ross & Son Company) to make the slurry. In order to obtain thick electrodes, the solid content was adjusted to between 50-65%. The slurry was casted at the desired loading on a 20-micron aluminum foil using a pilot scale slot-die coater. Control cathodes were directly dried at 120° C., optionally compressed by an automated IRM 200 heated roll calender press then punched with matched-metal die to form the positive electrode. Test cathodes were dried by subjecting the coated cathodes to drying using VFM techniques. VFM drying was performed using a frequency sweep from 5850 MHz to 6650 MHz with a sweep rate of 100 msec. The sweep wave form was a sawtooth. The microwave power output of the system was 2.25 KW TWT and the drying was performed at 95% max rated power. Total microwave exposure time was 5 min. An aluminum strip was welded to the foil of the dried electrode to serve as positive terminal.

For production of an anode, a commercially available natural graphite (from Nippon Carbon Co.) with a capacity of 360 mAh/g was selected. The anode active powder and a conductive carbon were mixed with either PVdF or SBR binder (Zeon, BM-400B) to make a slurry (solid content 35% to 50%) by using a Flacktec SpeedMixer. The slurry viscosity and stability were checked by using a rheometer (TA Instruments AR2000). Electrodes were cast onto copper foil using a TMI K-control doctor blade coater and dried in a vacuum oven at 90° C., 120° C. or by VFM irradiation using parameters as for the cathode.

Adhesion and Cohesion

Figure 2:
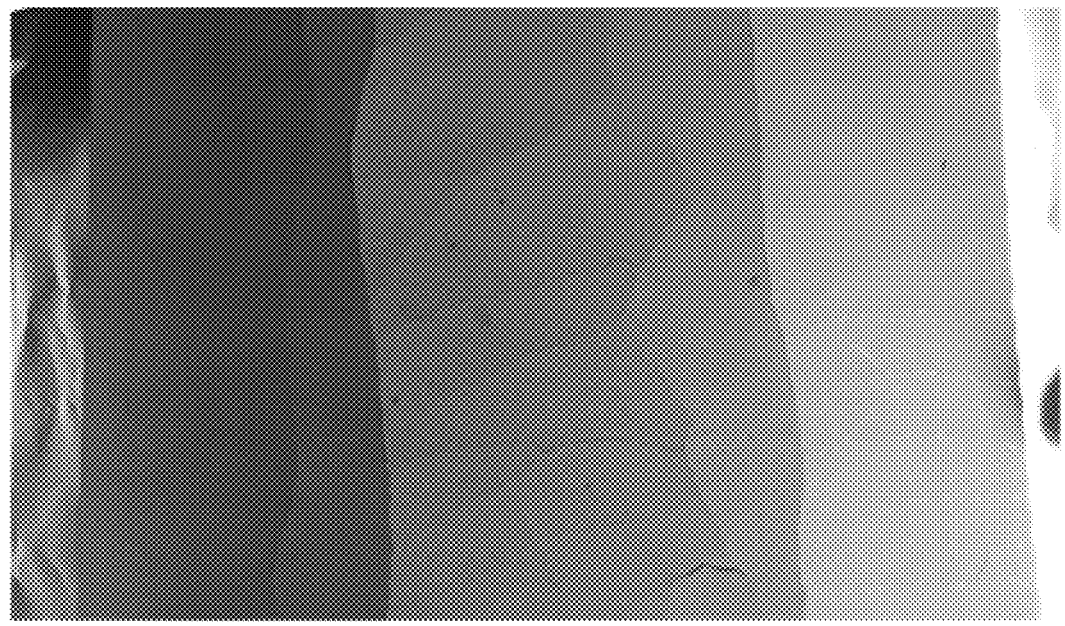
FIG. 2 is a representative image of an anode dried using air (A) or using VFM (B) and subsequently subjected to a mandrel test.
Figure 2:
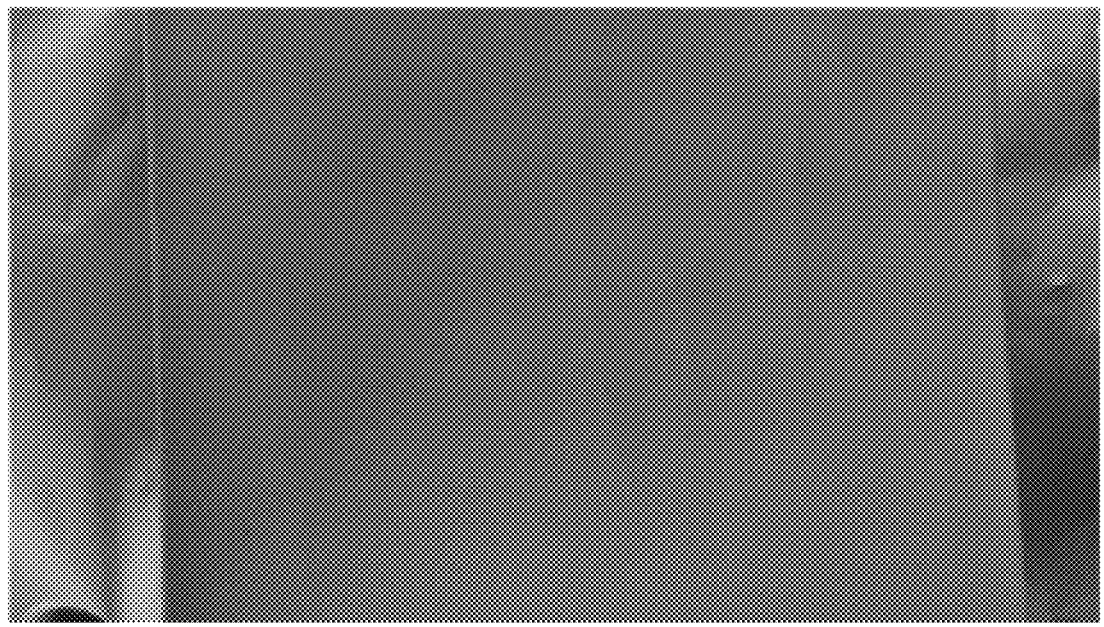

The electrodes were qualified for adhesion and flexibility using the following established standard operating procedures for production electrode quality assurance:

Mandrel test: The test unit was set up by placing a mandrel bar (size of 2, 3, and 4 mm) between two rollers. An electrode sample was slit to 4" long. Some samples were calendered to a porosity of 40% and others were not calendered. Holding each sample electrode at each end, the sample was rolled back and forth over mandrel bar 5 or 6 times. The sample dried using hot air only revealed significant surface cracking. By contrast in the hot air dried samples, no cracking or delamination was observed on the electrode surface dried using VFM at 80 degrees C. after the test (Grade 1, passed). The cathode results are presented in FIG. 1 and anode results depicted in FIG. 2. VFM in both anode and cathode produced high loading electrodes with excellent resistance to cracking and delamination by handling relative to traditionally dried electrodes.

Figure 3:
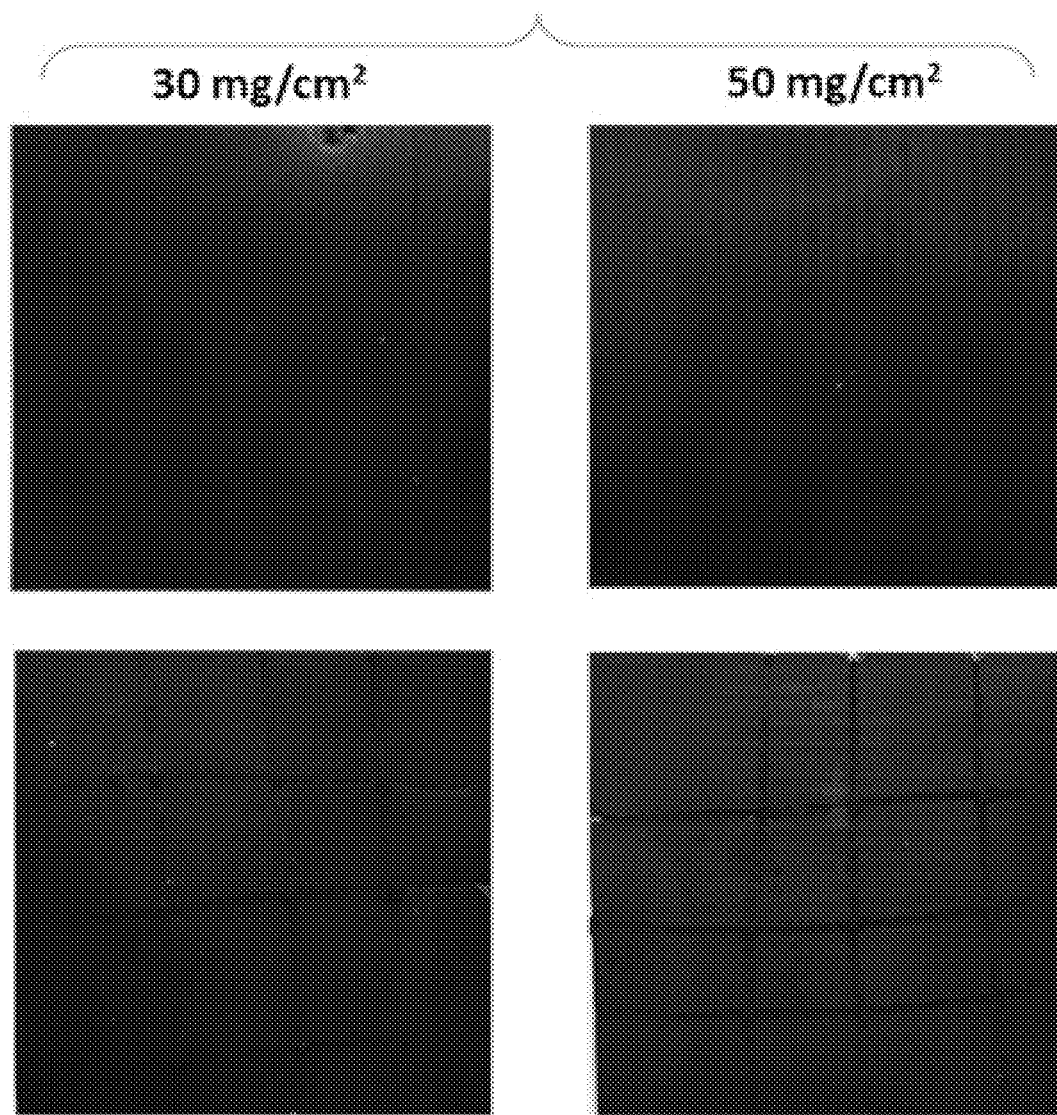
FIG. 3 illustrates NCM 523 cathodes calendered to 40% porosity with loadings of 30 mg/cm$^2$ and 50 mg/cm$^2$ either dried under (A) hot air at 120° C. or (B) using VFM techniques.
Figure 3:
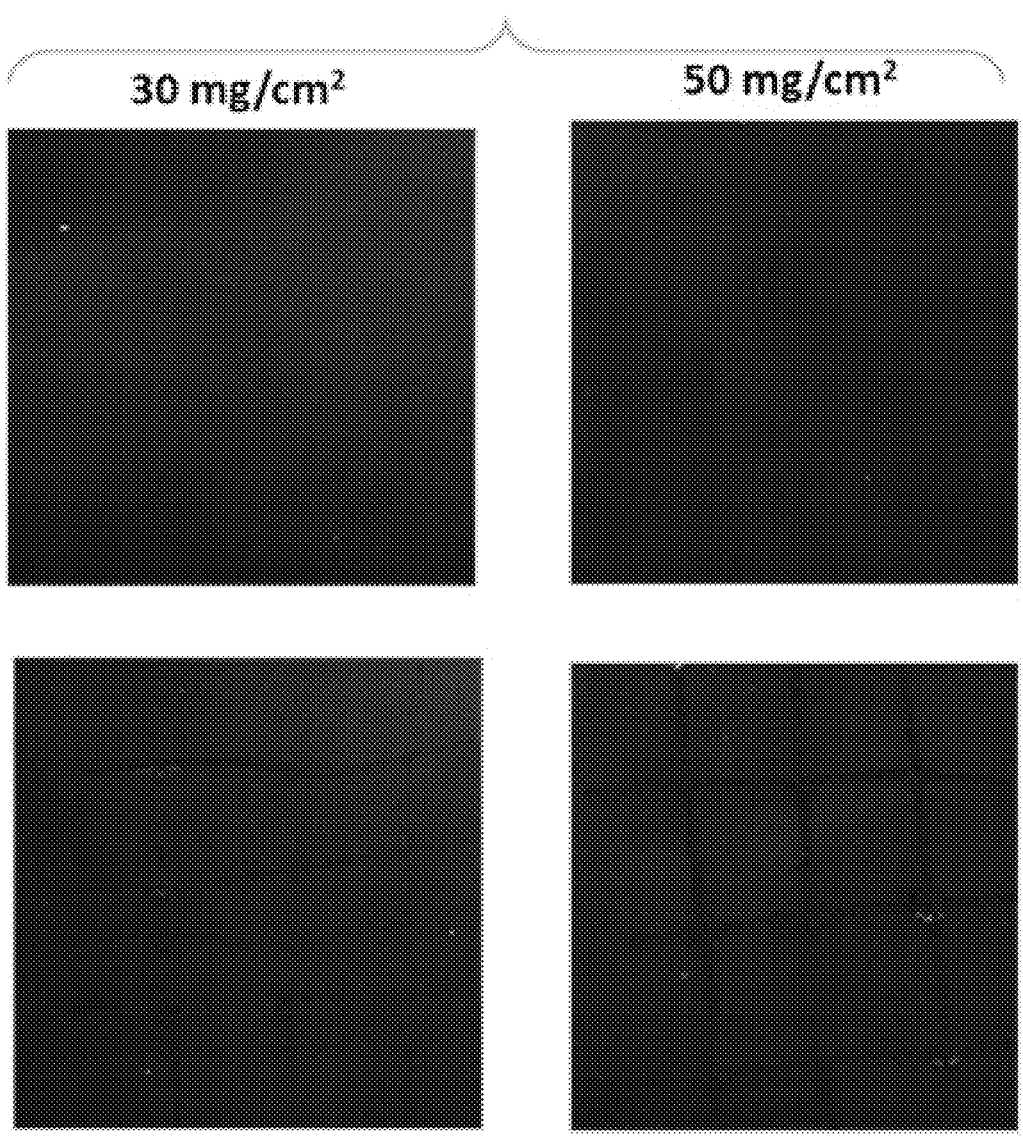

Wet Adhesion: In a standard operation, three pieces of 2"×3" electrode are soaked in an electrolyte at 85° C. for 2 hours while contained in a sealed pouch. The electrode is removed from the pouch and blotted dry with a paper towel. On patted-dry electrodes, the operator uses the end of a razor blade and gently scrapes the electrode using constant pressure. After making three scribes, the electrode is rotated to an angle of 90 degrees and three more scribes are made thus creating a cross hatch pattern. The resulting electrodes are scored as follows:

1: No foil observed after all scribes are made
2: Foil is observed along the scribe line
3: Foil and flaking around crossed scribes observed
4: >⅔ of active material flakes off or total delamination FIG. 3 shows the surfaces of cathodes made as above before and after the hot electrolyte test. The samples showed scraping marks only under the razor blade tips and only small delamination was observed (Grade 2) illustrating excellent wet adhesion of electrodes dried using VFM similar to those dried using traditional air drying techniques.

Cohesion

Cathodes made as above were subjected to cohesion testing. Samples of the electrode prepared as above were cut into square (3 cm×3 cm) and weighed. Electrodes were taped to a glass slide using double sided tape. A piece of KAPTON tape (10-15 cm) was placed on top of the electrode. Sample length and tape width were measured as well as the assembly weight. The entire assembly was placed on a tensometer using cell clamps. The top clamp was moved at 20 mm/min with an average force of 4N. The final assembly was weighed and samples were scored by mass loss per unit area and mass loss percentage with respect to initial electrode mass. Table 1 illustrates the results.

TABLE 1

| Drying Method | Loading mg/cm$^2$ | Mass loss (wt %) |
|---|---|---|
| Hot Air | 30 | 0.8 |
| | 50 | 2.4 |
| VFM | 30 | 0.7 |
| | 50 | 2.5 |

Electrochemical Properties

Electrode rate capability was also evaluated in Li half cells at 4.2 to 2.7V. Cathodes made as above were calendered to 40% porosity target thickness. The cell was charged at C/5 and discharged at different C-rates. The cathodes were validated independently in coin half cells versus lithium metal and in Li ion pouch cells versus baseline production-quality counter-electrodes. All the cells were assembled using semi-automated pilot cell production equipment.

Figure 4:
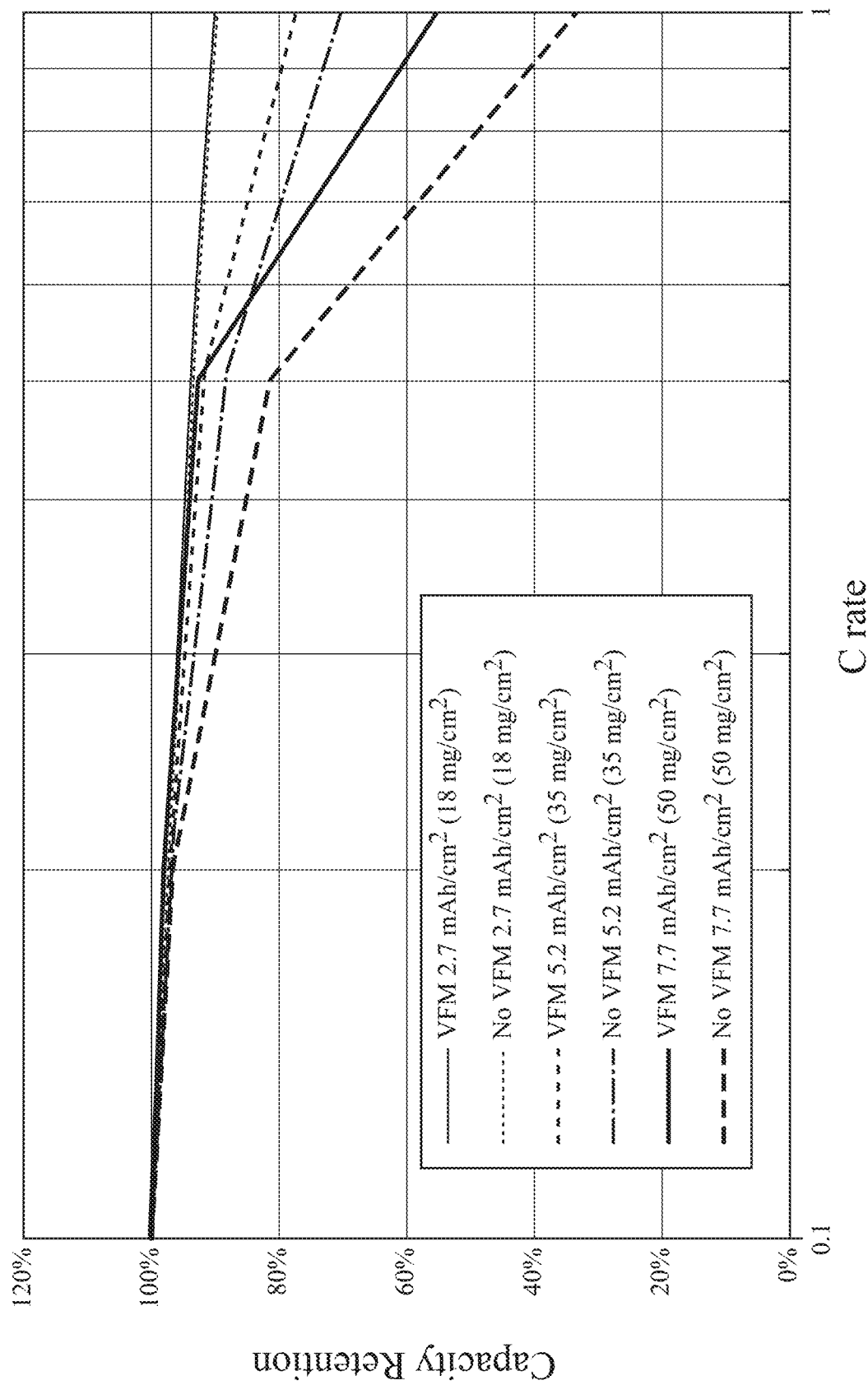
FIG. 4 illustrates the rate capability of cathodes formed using traditional air drying techniques or by VFM illustrating improved capacity retention of VFM dried electrodes.

As the cathode loading increased to 30 mg/cm$^2$ or greater the VFM dried electrodes showed improved performance compared to those prepared using hot air drying only. At C/2 the electrodes with a loading of 50 mg/cm$^2$ were capable of similar capacity retention as a standard prepared 18 mg/cm$^2$ loaded electrode. Results are illustrated in FIG. 4.

Figure 5:
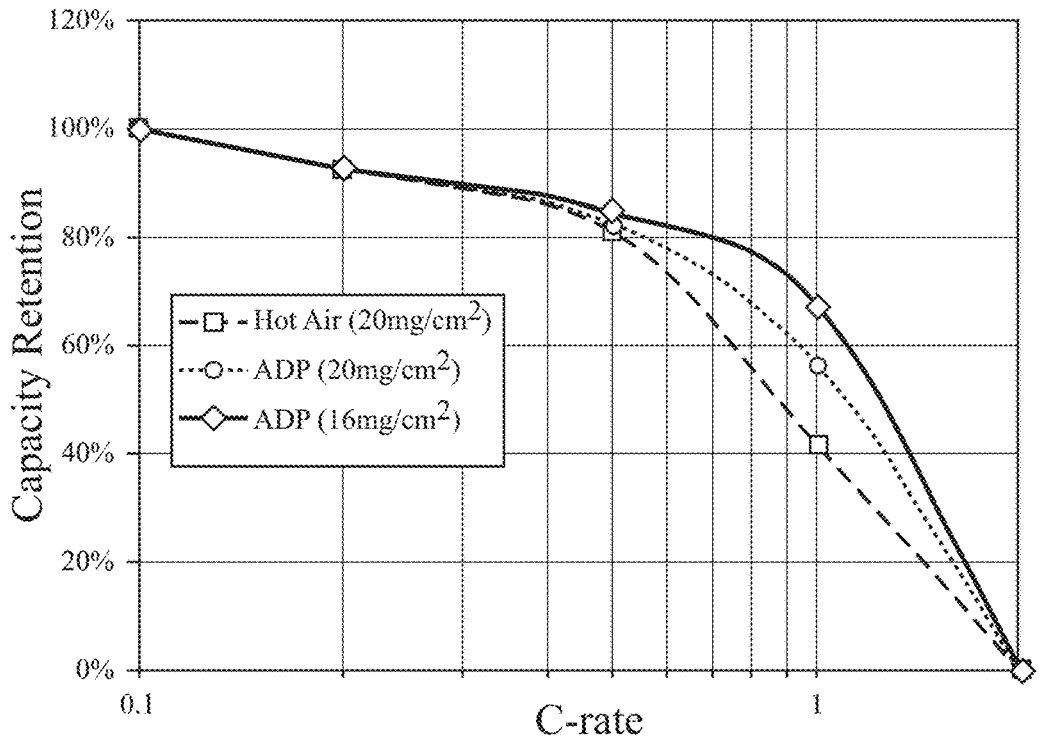
FIG. 5 illustrates the rate capability of anodes prepared using either (A) water based binder or (B) NMP based binder demonstrating improved capacity retention of VFM dried electrodes.
Figure 5:
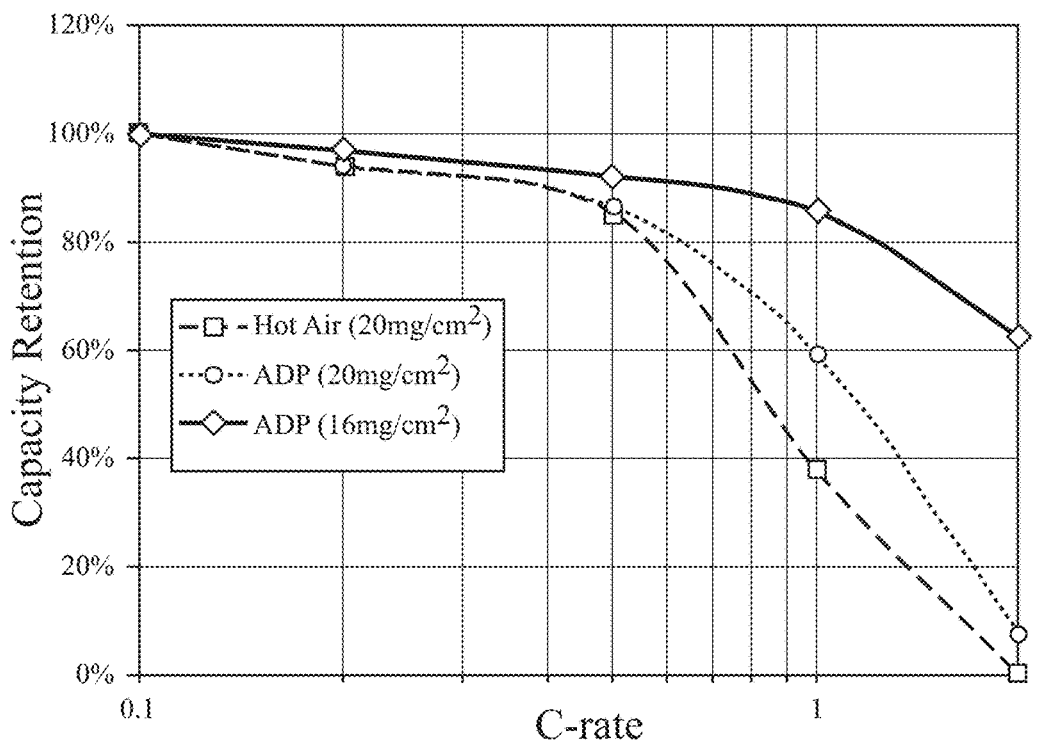

Anode: Similar protocols are performed using anodes prepared with either a water based binder (SBR) or a solvent based binder (PVdF). When SBR binder is used, the mass ratios were 97/2/1 wt % for active material/SBR/CMC (carboxyl methyl cellulose). When PVdF was used as binder the graphite content was 94%, PVdF was 5% and conductive additive 1%. Electrode rate capability was also evaluated in Li half cells 2.7 to 4.2V. The cell was charged at C/5 and discharge at 0.1, 0.2, 0.5, and 1.0C rates. The anode was tested against a Li metal counter electrode. The results are depicted in FIG. 5. Anodes prepared with both tested binders electrodes prepared using VFM irradiation showed improved rate capability.

Figure 6:
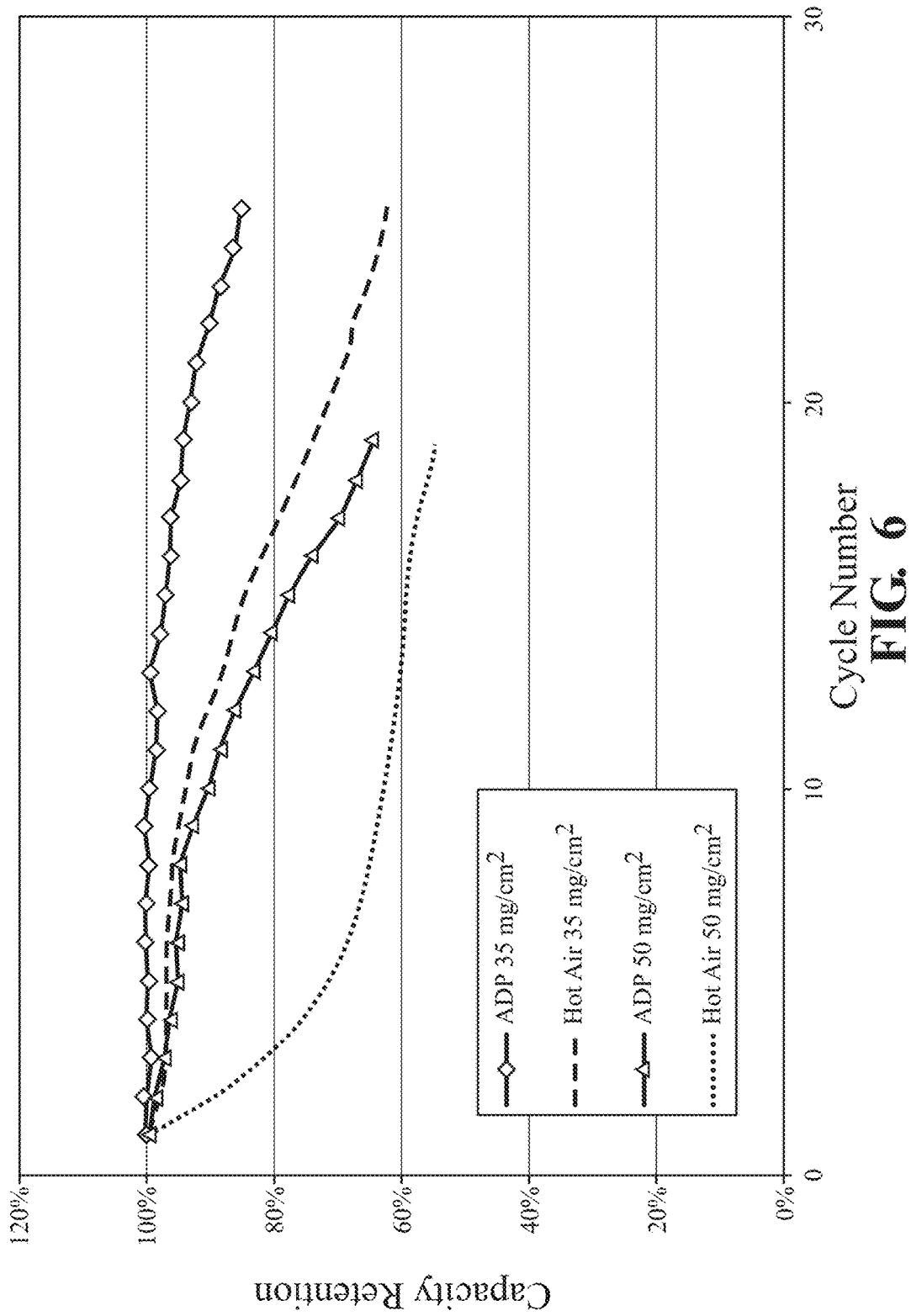
FIG. 6 illustrates capacity retention of NCM 523 cathodes dried using traditional air techniques (hot air) or VFM (ADP) illustrating improved capacity retention for cathodes prepared using VFM techniques.

Cycle Life: Cathodes prepared as above were evaluated in coin half cells. The cells were cycled at C/2 rate between 4.2-2.7 V. Electrodes were calendered to 40% porosity and annealed at 120° C. for 2 hours. The electrodes with high loading and dried using the VFM irritation process showed improved cycle life relative to hot air dried electrodes. Results are illustrated in FIG. 6.

Resistance

Figure 7:
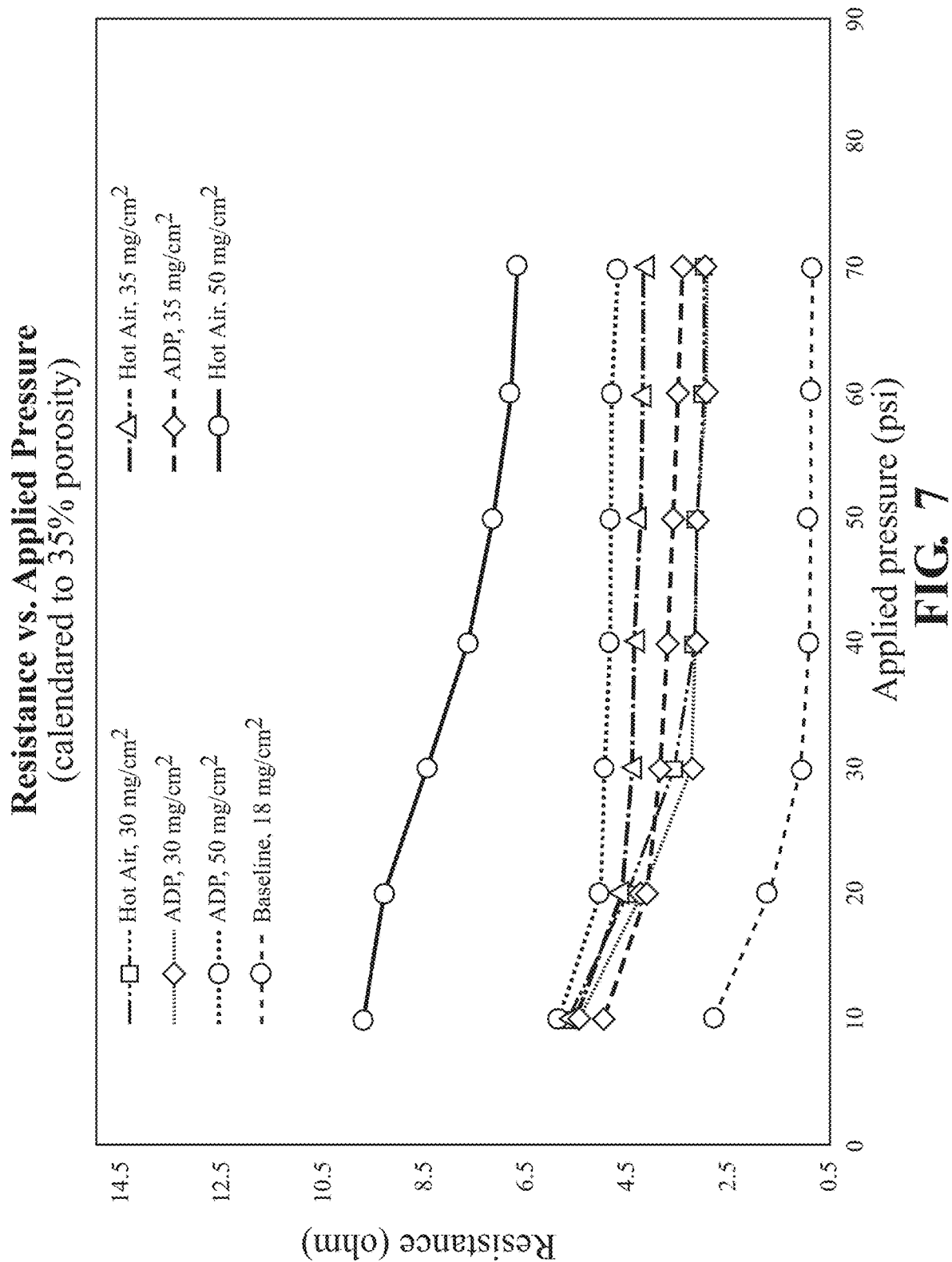
FIG. 7 illustrates through resistance of cathodes at various loading dried using either traditional techniques (hot air) or using VFM techniques (ADP)

Through resistance measurements were employed. Two ½" gold plated disks sandwich the ½" single coated electrodes. Resistance values (taken with a high precision multimeter) were taken at different pressures (10-70 psi with compressed air) applied to plates. Electrodes formed using high loading and dried using VFM irradiation demonstrated lower resistance than air dried electrodes. The results are illustrated in FIG. 7 showing reduced resistance in electrodes dried using VFM processes.

AC Impedance

Figure 8:
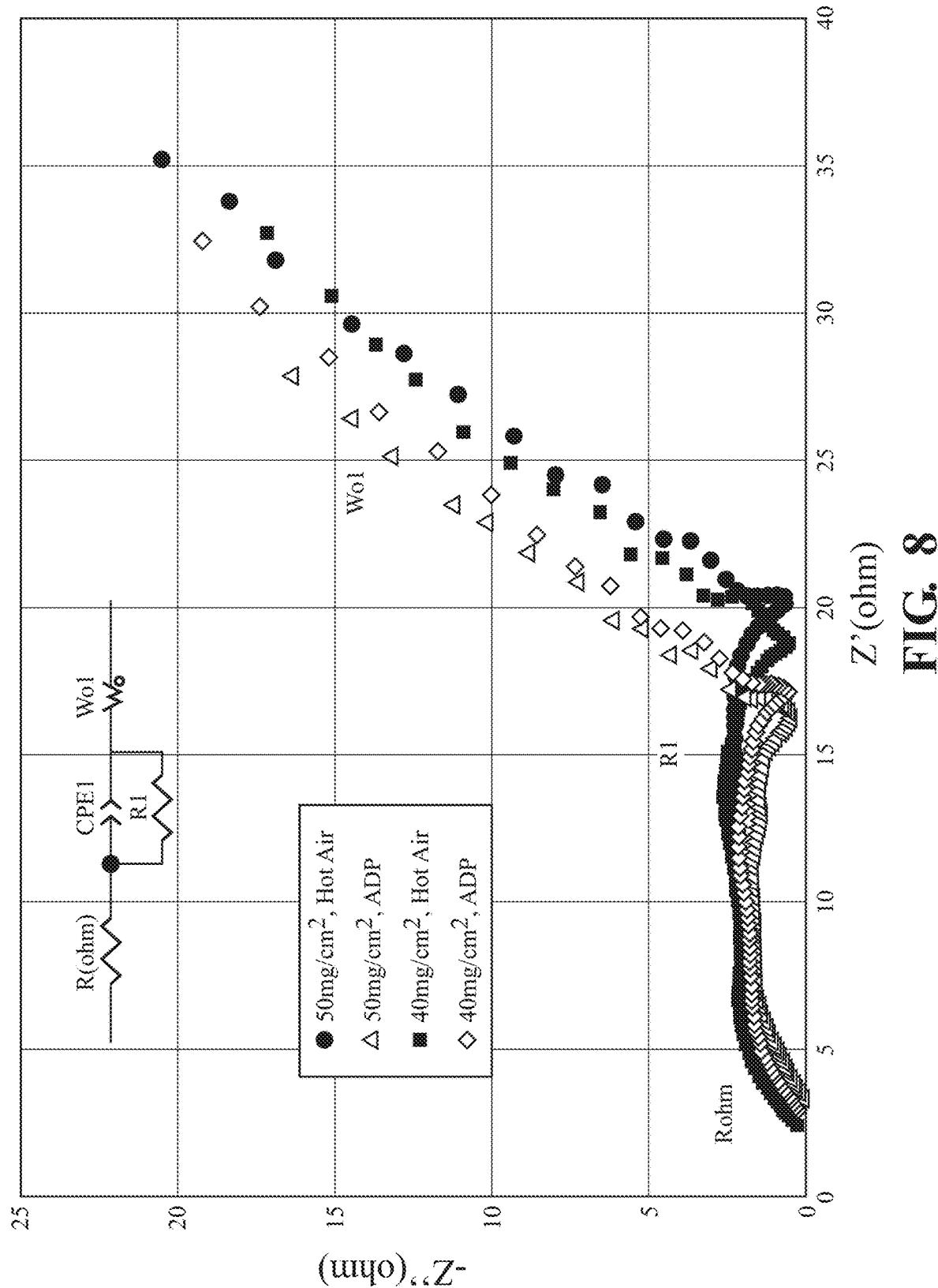
FIG. 8 illustrates the AC impedance of cathodes loaded to 40 mg/cm$^2$ or 50 mg/cm$^2$ and dried using either traditional air drying techniques (hot air) or by VFM (ADP)

Impedance measurements were performed using a Solartron SI 1287 Electrochemical Interface and SI 1260 Impedance/Gain-phase Analyzer. The NCM523 cathodes prepared as above using two loadings (40 mg/cm$^2$ and 50 mg/cm$^2$) were dried under either convection hot air (baseline) or with by VFM techniques. The cathodes were fabricated into Li half cells. Half cells were charged to 4.3V for the impedance test, with frequency sweeping from 1 MHz to 1 mHz and with AC amplitude at 5 mV. Equivalent circuit fittings were completed using the Z-view software to calculate Ohmic resistance ($R_{ohm}$), surface resistance (R1), and diffusion resistance ($Wo_1$). The results are shown in FIG. 8 and numerical results in Table 2. Significantly reduced AC impedance was observed at both 40 mg/cm$^2$ and 50 mg/cm$^2$ loadings.

TABLE 2

| | Cathode Loading (mg/cm$^2$) | | | |
| | 40 | | 50 | |
| Drying method | Hot air | VFM | Hot air | VFM |
|---|---|---|---|---|
| $R_{ohm}$ | 2.2 | 2.6 | 2.8 | 3.1 |
| R1 (Surface/Charge Transfer) | 16.1 | 13.8 | 16.6 | 12.5 |
| $Wo_1$ (Diffusion/Mass Transfer) | 74.7 | 66.2 | 126.5 | 67.9 |
| $R_{ohm}$ + R1 + $Wo_1$ | 93 | 82.6 | 145.9 | 83.6 |

Binder Distribution

Figure 9:
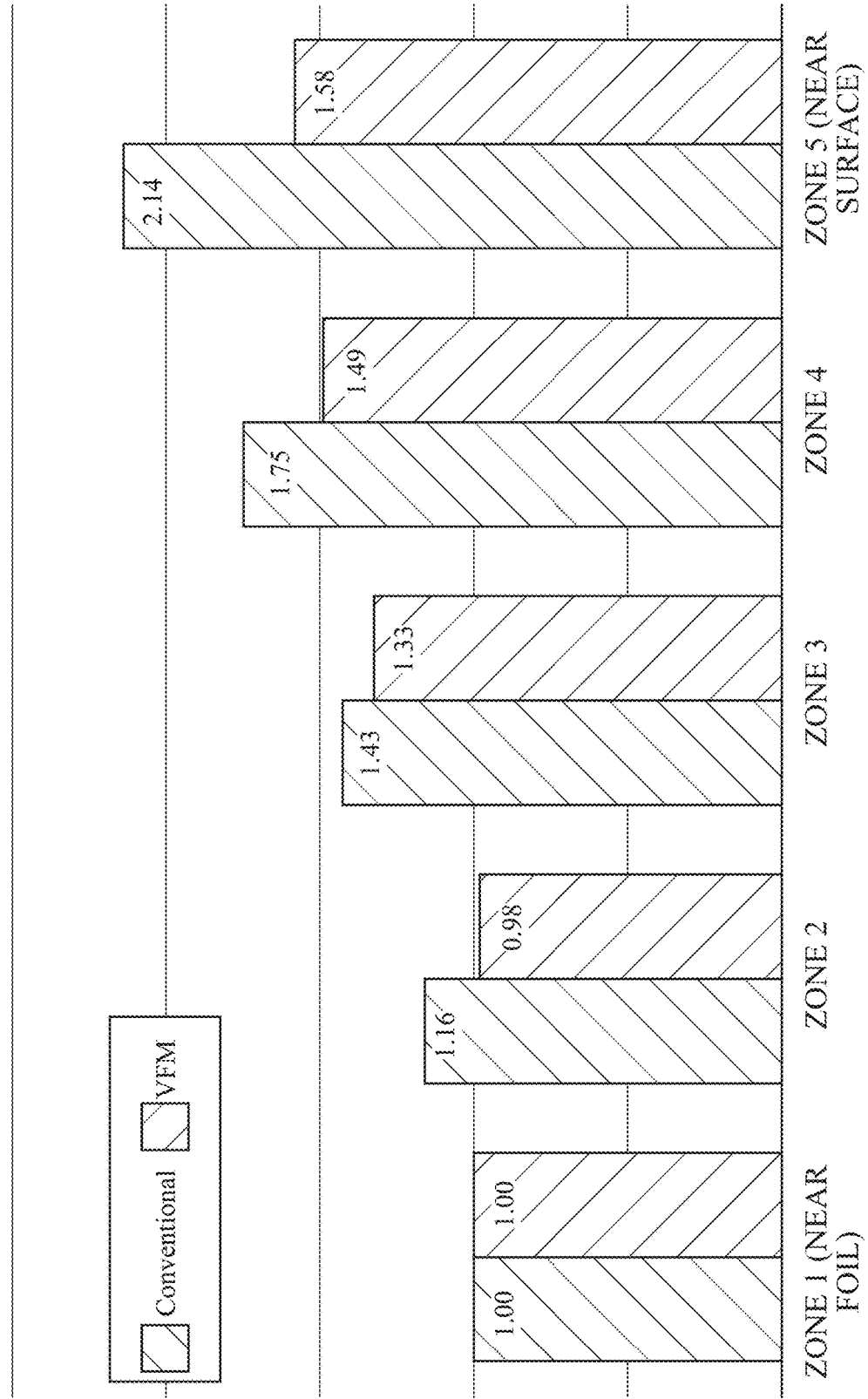
FIG. 9 illustrates binder distribution of cathodes with solvent-based PVDF binders illustrating greater uniformity of binder distribution when dried using VFM techniques as compared to traditional air drying techniques at loadings of 50 mg/cm$^2$.

Electrodes (anodes and cathodes) were subjected to measurements of binder distribution. The electrodes were divided into 5 regions extending from zone 1 (the ⅕$^{th}$ thickness nearest the current collector) to zone 5 (the ⅕$^{th}$ thickness nearest the electrode surface distal from the current collector). These zones are used when mapping (searching) for fluorine content (from the PVdF binder) using a scanning electron microscope (SEM) equipped with energy disperse X-ray spectroscopy (EDS) system. The EDS software (EDAX from Ametek) provides weight percent of fluorine in the different zones giving a clear indication of binder distribution. For cathodes with a loading of 50 mg/cm$^2$, the binder distribution demonstrated greater uniformity throughout the electrode at all thickness zones as illustrated in FIG. 9.

Figure 10:
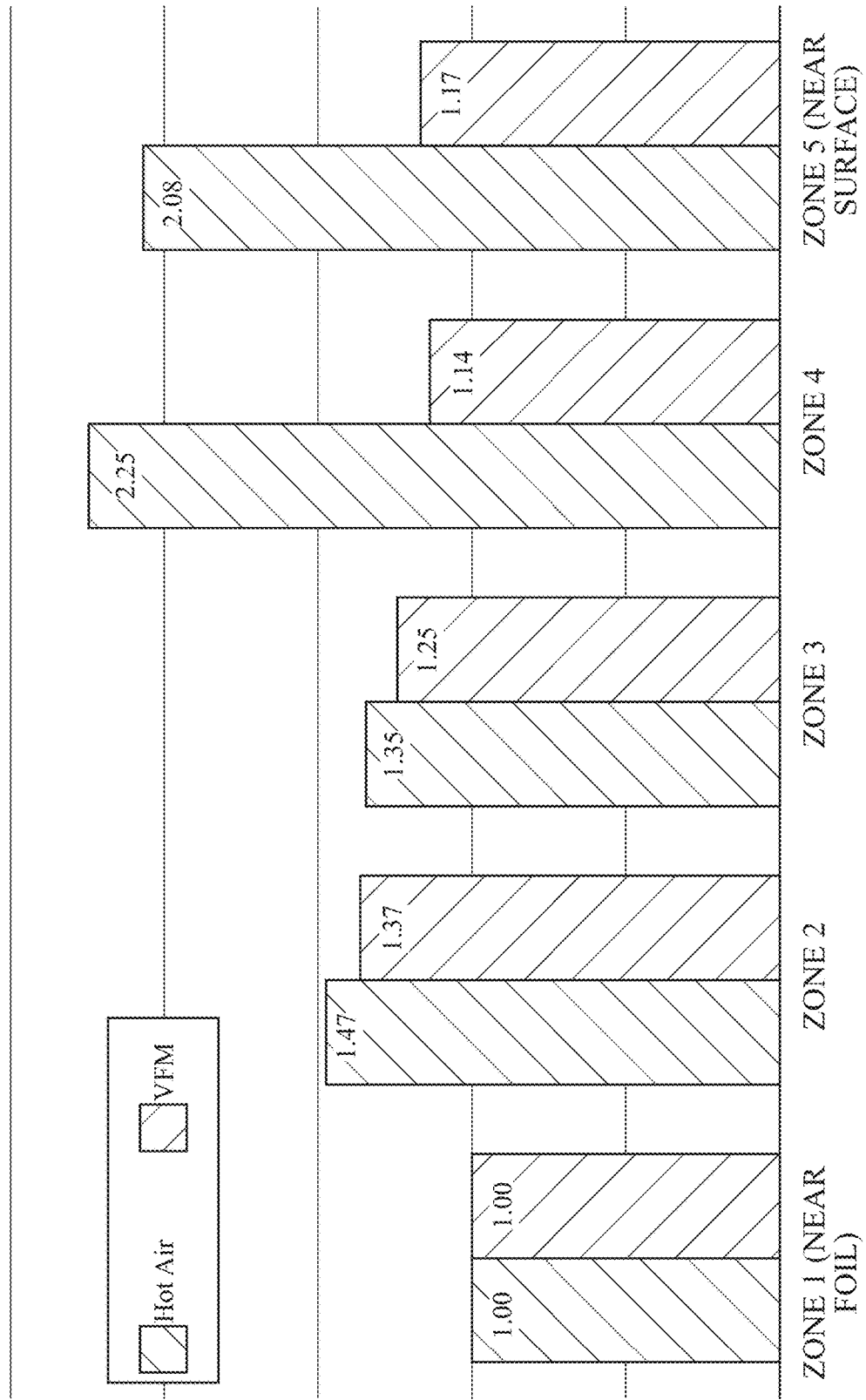
FIG. 10 illustrates binder distribution of anodes with water-based CMC/SBR binders illustrating greater uniformity of binder distribution when dried using VFM techniques as compared to traditional air drying techniques.
Figure 11:
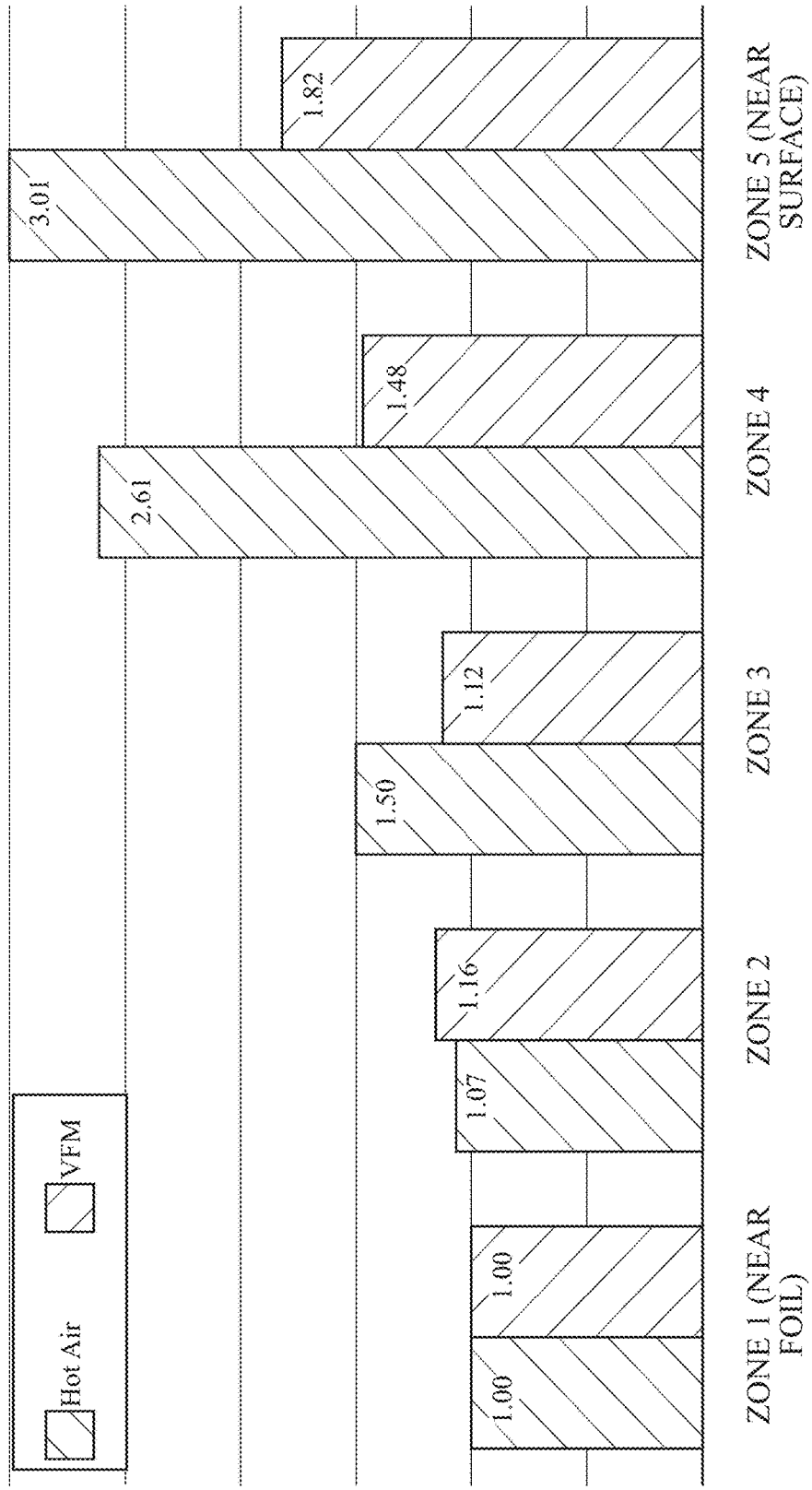
FIG. 11 illustrates binder distribution of anodes with solvent-based PVDF binders illustrating greater uniformity of binder distribution when dried using VFM techniques as compared to traditional air drying techniques.

Similar studies are performed with high loading anodes. For PVdF binder testing was performed as above. In order to perform binder distribution on SBR binders, the anodes were stained with osmium using osmium tetroxide ($OsO_4$) which is absorbed by the SBR binder. The presence of the heavy metal is sufficient to block the SEM electron beam clearly revealing SBR domains in the SEM image. Similar to the fluorine studies above, osmium metal was mapped in the different zones using EDS. Anodes using SBR binder/water with 20 mg/cm$^2$ loading showed a modestly reduced ratio of zone 5 binder to zone 1 when compared to traditional air dried electrodes. Anodes using SBR binder/water with 20 mg/cm$^2$ loading demonstrated greater uniformity than hot air dried electrodes as illustrated in FIG. 10. Similarly, anodes using NMP-based PVdF binder loaded to 20 mg/cm$^2$ showed a significantly lower zone 5/zone 1 ratio and greater uniformity than hot air dried electrodes. Results are illustrated in FIG. 11.

Various modifications of the present disclosure, in addition to those shown and described herein, will be apparent to those skilled in the art of the above description.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof

We claim:

1. An electrode comprising:
an electrochemically active material and a binder, the electrochemically active material intermixed with the binder; and
the electrochemically active material coated onto a current collector substrate;
wherein the electrochemically active material is an anode active material coated at an areal density of 10 mg/cm$^2$ or greater and the binder distributed within the electrochemically active material such that the concentration ratio of binder at a surface of the anode active material relative to the binder at a current collector substrate surface is 3.0 or lower.

2. The electrode of claim 1, wherein the areal density is 10 mg/cm$^2$ to 30 mg/cm$^2$.

3. The electrode of claim 1, wherein the areal density is 15 mg/cm$^2$ to 25 mg/cm$^2$.

4. The electrode of claim 1, wherein the ratio is 2.5 or lower.

5. The electrode of claim 1, wherein the ratio is 2.3 or lower.

6. The electrode of claim 1, wherein the binder is distributed within the electrochemically active material such that a midpoint ratio, defined as the amount of binder at a midpoint of the electrochemically active material relative to the binder at a current collector substrate surface, is 1.5 or lower.

7. The electrode of claim 6, wherein the midpoint ratio is 1.4 or lower.

8. The electrode of claim 1, wherein the binder is a non-aqueous binder.

9. The electrode of claim 1, wherein the electrochemically active material delithiates at a potential below 1.5 V versus lithium metal.

10. The electrode of claim 1, wherein the electrochemically active material delithiates at a potential below 2.0 V versus lithium metal.

11. The electrode of claim 1, wherein the electrochemically active material comprises silicon, tin, carbon, natural graphite, graphene, artificial graphite, expanded graphite, carbon fibers, hard carbon, carbon black, carbon nanotubes, fullerenes, activated carbon, a composite material of a metal or metal compound and a carbon or graphite material whereby a metal optionally includes lithium and silicon, or a lithium-containing nitride.

12. The electrode of claim 1, wherein the electrochemically active material comprises graphite and one or more of silicon, lithium, or a metal.

13. The electrode of claim 1, having a cycle life characterized by a residual capacity in excess of 80% at cycle 20.

14. The electrode of claim 1, having a cycle life characterized by a residual capacity in excess of 80% at cycle 25.

15. The electrode of claim 1 having a capacity retention of 90% or greater at 0.5C rate.

16. The electrode of claim 1 having a capacity retention of 80% or greater at 0.6C rate.

17. The electrode of claim 1 having a capacity retention of 50% or greater at 1C rate.

18. A secondary cell comprising an anode, a cathode, and an electrolyte contacting said anode and said cathode, wherein the anode is the electrode of claim 1.

19. The secondary cell of claim 18, wherein the electrochemically active material is an anode active material and the areal density is 10 mg/cm$^2$ to 30 mg/cm$^2$.

20. The secondary cell of claim 18, wherein the binder is distributed within the electrochemically active material such that a midpoint ratio, defined as the amount of binder at a midpoint of the electrochemically active material relative to the binder at a current collector substrate surface, is 1.5 or lower.

* * * * *